United States Patent [19]

Sakurai et al.

[11] Patent Number: 5,679,765
[45] Date of Patent: Oct. 21, 1997

[54] POLYETHER HAVING HETEROFUNCTIONAL GROUPS AT BOTH ENDS, PROCESS FOR THE PREPARATION THEREOF AND POLYMERIZATION INITIATOR THEREFOR

[75] Inventors: Yasuhisa Sakurai, Tokyo; Teruo Okano, Ichikawa; Masayuki Yokoyama, Matsudo; Kazunori Kataoka, Kashiwa; Yukio Nagasaki, Kashiwa; Nobuyuki Ohsako, Kashiwa; Masao Kato, Tsukuba, all of Japan

[73] Assignee: Research Development Corporation of Japan, Tokyo, Japan

[21] Appl. No.: 680,781

[22] Filed: Jul. 16, 1996

Related U.S. Application Data

[60] Continuation of Ser. No. 487,125, Jun. 7, 1995, abandoned, which is a division of Ser. No. 14,285, Feb. 5, 1993, Pat. No. 5,483,008.

[30] Foreign Application Priority Data

Feb. 7, 1992 [JP] Japan ......................... 4-23015
Jan. 22, 1993 [JP] Japan ......................... 5-9168

[51] Int. Cl.$^6$ .................... C08G 59/68; C08G 65/04
[52] U.S. Cl. ............... 528/409; 252/182.14; 252/182.27; 252/182.3; 252/182.34
[58] Field of Search ................. 528/409; 252/182.14, 252/182.27, 182.3, 182.34

[56] References Cited

U.S. PATENT DOCUMENTS

| | | | |
|---|---|---|---|
| 3,425,960 | 2/1969 | Sandler et al. | 528/408 |
| 4,243,787 | 1/1981 | Boileau et al. | 526/180 |
| 4,833,213 | 5/1989 | Lier et al. | 525/410 |
| 4,943,626 | 7/1990 | McGrath et al. | 525/409 |
| 5,478,920 | 12/1995 | Drysdale | 528/410 |

OTHER PUBLICATIONS

Griehl et al, Chemical Abstracts 108:105259, "Catalysts for the Preparation of Polymers with Terminal Amino Groups" Jul. 1987.

*Primary Examiner*—Frederick Krass
*Attorney, Agent, or Firm*—Pennie & Edmonds

[57] ABSTRACT

The present invention relates to a bifunctional polyether having groups different from each other at both ends, with a polymerization degree of 5 to 10000 and consisting of repeating units each represented by the following formula (I):

$$-\underset{|}{\overset{R_1}{C}}HCH_2O- \qquad (I)$$

(wherein $R_1$, represents a hydrogen atom, halogen atom, or a lower alkyl group optionally substituted by a halogen atom, and $R_1$ in each repeating unit may be the same or different), as well as to a process for the preparation thereof and a polymerization initiator therefor. The process of production and polymerization initiator of the present invention enable 100% introduction of a primary amino group into one of the ends of polyether.

2 Claims, 3 Drawing Sheets

FIG.2
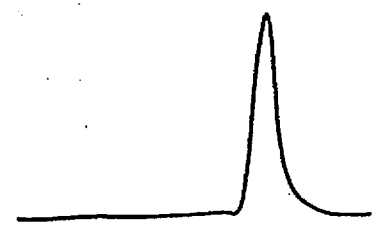
(a) Sample re-precipitated with diethyl ether
10  20  30
Effluent volume (ml)
(b) Sample obtained after vacuum drying
10  20  30
Effluent volume (ml)
| Conditions for measurement | Mobile phase: Tetrahydrofuran | Column: Toso TSK gel G2000Hx1 +G3000Hx1 +G4000Hx1 |
|---|---|---|
| | Flow rate: 1.0ml/min | |
| | Detection: Differential refractive index | |
| | Temperature: 40°C | |

POLYETHER HAVING HETEROFUNCTIONAL GROUPS AT BOTH ENDS, PROCESS FOR THE PREPARATION THEREOF AND POLYMERIZATION INITIATOR THEREFOR

This is a continuation of application Ser. No. 08/487,125, filed Jun. 7, 1995 now abandoned, which is a division of application Ser. No. 08/014,285, filed Feb. 5, 1993, now U.S. Pat. No. 5,483,008.

INTRODUCTION

The present invention relates to a polyether having different functional groups at both ends, a process for the preparation thereof, and a polymerization initiator therefor.

BACKGROUND OF THE INVENTION

It has so far been carried out to react with a low-molecular compound the terminal hydroxyl group of polyethylene oxide obtained from a 3-membered ether or of polyether, such as polypropylene oxide, polyepichlorohydrin, etc. (including a copolymer thereof), in order to introduce a functional group other than a hydroxyl group into the terminal (J. Polym. Sci., Polym. Chem. Ed., 22, 341–352 (1984)). In the prior art process, one kind of functional group has been introduced. It has also been carried out using a polyether carrying a unreactive functional group (methoxy group) at one end and a hydroxyl group at another end to convert said terminal hydroxyl group into another functional group, in order to introduce a functional group into only one of the ends (Makromol. Chem., 182, 1379–1384 (1981)).

SUMMARY OF THE INVENTION

The present invention relates to a bifunctional polyether having groups different from each other at both ends, with a polymerization degree of 5 to 10000 and consisting of repeating units each represented by the following formula (I):

wherein $R_1$ represents a hydrogen atom, a lower alkyl group, aryl group or aralkyl group, and $R_1$ in each repeating unit may be the same or different), as well as to a process for the preparation thereof and a polymerization initiator therefor. The process of production and polymerization initiator of the present invention enable 100% introduction of a primary amino group into one of the ends of polyether.

DESCRIPTION OF THE FIGURES

FIG. 2 is a drawing showing a gel permeation chromatogram of the polyethylene oxide obtained in Example 1.

DETAILED DESCRIPTION OF THE INVENTION

Figure 1:
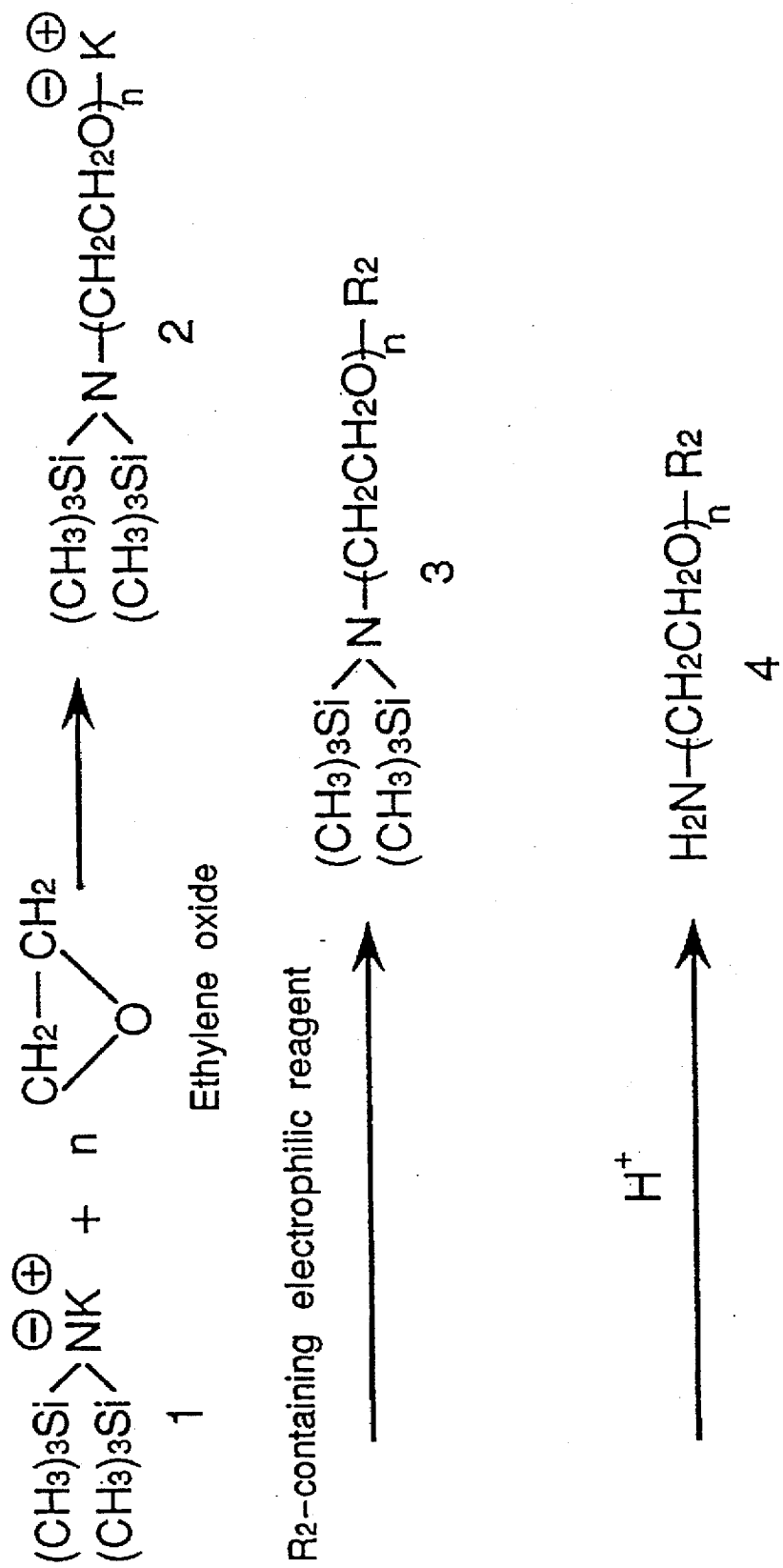
FIG. 1 is a drawing showing a pathway for the synthesis of a polyethylene oxide having heterofunctional groups at the terminals using potassium bis(trimethylsilyl)amide as a polymerization initiator.

A polyether with functional group(s) is employed for the modification of a physiologically active substance or as an in vivo carrier for pharmaceuticals.

However, with a polyether having a functional group at only one of the terminals, it is not possible to bind substances such as proteins etc. to both of the terminals of polyether, and with a polyether having the same kind of functional groups at both of the terminals, it is difficult to bind two different kinds of proteins etc. to the terminals of polyether.

That is, the principal object of the present invention is to provide a bifunctional polyether having functional groups different from each other at both terminals.

The polyether of the present invention is a bifunctional polyether having functional groups different from each other at both ends, with a polymerization degree of 5–10,000 and consisting of repeating units each represented by the following formula (I):

wherein $R_1$ represents a hydrogen atom, a lower alkyl group, aryl group or aralkyl group and $R_1$ in each repeating unit may be the same or different.

In the above formula (I), the lower alkyl group represented by $R_1$ is a straight-chain or branched $C_{1-5}$ alkyl group, such as methyl, ethyl, n-propyl, isopropyl, n-butyl, isobutyl, sec-butyl, tert-butyl, pentyl, and hexyl. The aryl group includes a phenyl group, methyl phenyl group, etc., and the aralkyl group includes a benzyl group, phenethyl group, etc.

The present polyether is characterized by possessing two different kinds of functional groups at both terminals, and the functional group mentioned herein refers to a group being rich in reactivity and excluding an unreactive or less reactive group such as alkoxy group, e.g. methoxy, ethoxy, etc.

Said functional group includes e.g. an amino group, carboxyl group, hydroxyl group, aldehyde group, mercapto group, amide group, etc., and an aromatic group carrying said functional group(s) (e.g. a phenyl group), as well as a hydrocarbon chain carrying said functional group(s).

An example of said bifunctional polyether includes a polyether of the following formula:

$$NH_2-(CH_2CH_2O)_{n-1}-CH_2CH_2R_2 \quad (II)$$

wherein $R_2$ represents an active hydrogen-containing group, such as a mercapto group, carboxyl group, hydroxyl group, etc., and n is an integer of 5 to 10,000.

In addition, the polyether of the present invention is a bifunctional polyether represented by the following formula (III):

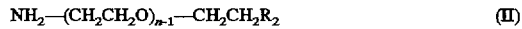

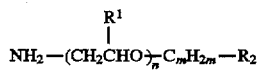

wherein $R_1$ and $R_2$ are the same as defined above, n is an integer of 5 to 10,000, m is 1 or 2, and $R_1$ in each repeating unit may be the same or different.

The present polyether represented by the above formula (I) can be produced by polymerizing an epoxy compound represented by the following formula (IV):

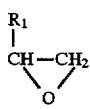

(wherein $R_1$ is the same as defined above) using potassium bis(trimethylsilyl) amide ($[(CH_3)_3Si]_2NK$) as a polymerization initiator.

In addition, the present polyether represented by formula (V):

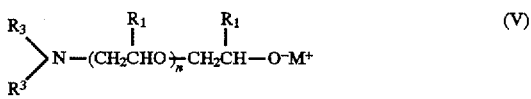

(wherein $R_1$ and n each are the same as defined above, $M^+$ represents a metal ion, such as lithium, sodium, potassium, etc., $R_3$ represents a protective group, such as trialkylsilyl group (in which alkyl represents lower alkyl) such as trimethylsilyl, phthalimide group, etc.), can be produced by polymerization of an epoxy compound of formula (IV):

(wherein $R_1$ is the same as defined above) using an alkali metal salt of bis(trimethylsilyl) amide or of phthalimide as a polymerization initiator. It will be appreciated by those skilled in the art that when $R_3$ is a phthalimide group, the phthalimide group is formed from N and both $R_3$ groups taken together, so that the amino end of the polyether is a single phthalimide moiety.

The polymerization initiators, potassium bis (trialkylmethylsilyl) amide, a bis(trimethylsilyl)amide alkali metal salt, and a phthalimide alkali metal salt, are known compounds in the art and have conventionally been employed as reagents for organic synthesis in haloketal cyclization etc. (M. Fieser, L. F. Fieser, "Reagents for Organic Synthesis" vol. 4, pp. 407–409 (1974) John Wiley & Sons, Inc., New York), but they have never been employed as a polymerization initiator.

That is, another object of the present invention is to provide a process for the preparation of a polyether of the above formula (I) comprising using potassium bis (trimethylsilyl)amide as a polymerization initiator in polymerization of an epoxy compound of the above formula (IV), as well as an anionic polymerization initiator comprising potassium bis(trimethylsilyl)amide.

A polyether directly obtained by polymerization of an epoxy compound (IV) using potassium bis(trimethylsilyl) amide as a polymerization initiator possesses $[(CH_3)_3Si]_2N-$ at one end, or a polyether directly obtained by polymerization of an epoxy compound (IV) using an alkaline metal salt of bis(alkylsilyl)amide or of phthalimide as a polymerization initiator possesses $[(R)_3Si]_2N-$ or $C_6H_4(CO)_2N-$ at one end, which in turn is converted into a primary amine group ($NH_2-$) by treatment with a weak acid. The polyether possesses a nucleophilic group $-O^-K^+$ or $-O^-K^+$ at another end, into which a wide variety of functional groups can be introduced by reaction of this terminal with a great variety of reagents.

The amino group ($NH_2-$) at one end originates in the polymerization initiator, so that the amino group is present in every polymer chain, and this is a characteristic feature of the present polyether. Another end of the polyether is the nucleophilic group $-O^-K^+$ or $-O^-K^+$ into which a wide variety of functional groups can be introduced by reaction of this terminal with a tosyl group etc. In addition, $[(CH_3)_3Si]_2N-$ or $NH_2-$ originating in the polymerization initiator may be reacted with a suitable reagent and thereby converted into a functional group other than the primary amino group and different from another end, whereby a polyether having an arbitrary combination of different kinds of terminal functional groups can be synthesized. For example, a carboxyl group can be introduced by reacting with tert-butyl bromoacetate as shown in Example 5. A mercapto group can also be introduced by reacting with ethylene sulfide as shown in Example 6.

In the following, the present invention is further illustrated with reference to the polymerization of ethylene oxide in accordance with the process of production of the present invention.

FIG. 1 shows polymerization of ethylene oxide using potassium bis(trimethylsilyl)amide (1). The polymerization proceeds with a typical active anion species, so that there is no termination of polymerization, and a straight-chain polyethylene oxide of extremely narrow molecular-weight distribution (2) can be obtained. In addition, a polymer with an arbitrary molecular weight can be obtained by a change in a "monomer/polymerization initiator" ratio. That is, the average polymerization degree of the resulting polymer is almost the same as "number of moles of monomer/number of moles of polymerization initiator."

Then, the group $-O^-$, which is one of the terminal groups of polyethylene oxide (2), is allowed to react with a suitable electrophilic reagent, whereby a polyethylene oxide with the group $-OR_2$ introduced into one end (3) is obtained. Subsequently, the other terminal group $[(CH_3)_3Si]_2N-$ is treated with a mild acid, whereby a polyethylene oxide having the primary amino group at one end and the group $-OR_2$ at another end (4) can be obtained. The rate of introduction of the group $-OR_2$ into one end depends on the rate of reaction from (2) to (3), but the primary amino group at another end originates in the polymerization initiator (1), and thus 100% introduction rate of primary amino group can be easily attained. The products obtained by treatment of (2) with distilled water as shown in Example 1 or with hydrochloric acid as shown in Example 2 are polyethylene oxides 100% of which have a primary amino group at one end and a hydroxyl group at another end. Furthermore, a disulfide group can be introduced by reacting (2-tosylate) ethyldisulfide, e.g. as shown in Example 3. By reducing this compound with a reducing agent such as $LiAlH_4$, a polyethylene oxide having an amino group at one end and a mercapto group at another end can be obtained.

In addition, a polyethylene oxide having an arbitrary combination of different kinds of terminal groups can be obtained by converting the terminal, primary amino group into a functional group other than the group $-OR_2$.

In addition, the present polymerization and synthetic method can be effected using an alkaline metal salt of phthalimide as a polymerization initiator in the same manner as described above.

Furthermore, the present polymerization and synthetic method can be applied to a polyether consisting of 3-membered cyclic ethers other than ethylene oxide.

EFFECT OF THE INVENTION

A polyether having groups different from each other at the terminals could be provided according to the present invention. In addition, 100% introduction of a primary amino group into one of the terminals of polyether was made possible according to the process of production and polymerization initiator of the present invention. As described, a polyether with functional terminals useful in many fields could be provided according to the present invention.

EXAMPLES

The present invention is further illustrated with reference to the following examples, but these examples are not intended to limit the scope of the present invention.

Example 1

6.64 g ethylene oxide was dissolved in 20 ml tetrahydrofuran at −79° C. in a glass polymerization tube, followed by addition of 5.80 ml of 0.5M potassium bis(trimethylsilyl) amide in toluene. The mixture was frozen in liquid nitrogen, then degassed under vacuum, and sealed. After being stirred at 20° C. over 50 hours, 10 ml of the reaction mixture was added dropwise to 120 ml diethyl ether at 0° C., thereby forming precipitates which in turn were dried under vacuum. The yield was 1.63 g. From about 20 ml of the remainder of the reaction mixture, the solvent was distilled out under vacuum. The yield was 4.11 g. Both of the samples thus obtained were analyzed by gel filtration type high-performance liquid chromatography. As a result, both of the samples indicated the same average molecular weight and molecular-weight distribution, as shown in FIG. 2. Its average molecular weight and "weight-average molecular weight/number-average molecular weight," as determined using the standard samples of polyethylene oxide, were 2700 and 1.1, respectively.

$^{13}$C-NMR(CDCl$_3$): 54.1, 60.2, 70.3, 72.3.

This average molecular weight is extremely close to the molecular weight of 2500 as calculated from the ratio of ethylene oxide and potassium bis(trimethylsilyl)amide so that it was found that one polymer chain per molecule of polymerization initiator was obtained as designed. Both of the obtained samples were mixed, then dissolved in 40 ml distilled water, and adsorbed onto an ion exchange resin (200 ml Diaion PK216), followed by washing with 400 ml distilled water. Then, the fraction eluted with 5% ammonia water was lyophilized. The yield was 94.1%. Titration of this sample in chloroform using an acetic acid solution of 0.1N HClO$_4$ revealed the presence of 4.0×10$^{-4}$ mol basic groups per g of the sample, and this value was almost equal to 3.7×10$^{-4}$ mol calculated assuming that every polymer of the molecular weight of 2700, as determined by gel filtration type high-performance liquid chromatography, possesses a primary amino group at one end. Hence, it was found that a primary amino group was present quantitatively at one end of the polyethylene oxide.

The polymer obtained in this example is represented by the following formula:

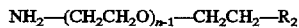

wherein R$_2$ stands for hydroxyl group, and n stands for 60.

Example 2

According to the same procedure as in Example 1, 10.13 g (0.23 mol) ethylene oxide was polymerized over 3 days in 50 ml tetrahydrofuran in the presence of 0.21 mmol potassium bis(trimethylsilyl)amide. The solution was solidified on the third day of polymerization, and it was melted by heating at 50° C. and then added dropwise to 500 ml diethyl ether, thereby forming precipitates. This sample was then dissolved in tetrahydrofuran, followed by addition of a few drops of 0.1N hydrochloric acid and stirring over 3 min. The solution was again added dropwise to diethyl ether and thereby re-precipitated. The sample thus obtained was then dried under vacuum. The yield was 82.9%. Analysis of the product by the same gel filtration type high-performance liquid chromatography as in Example 1 revealed that the average molecular weight was 25000, and the "weight-average molecular weight/number-average molecular weight" was 1.1.

The polymer obtained in this example is represented by the following formula:

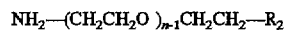

wherein R$_2$ stands for a hydroxyl group, and n stands for 570.

Example 3

Figure 3:
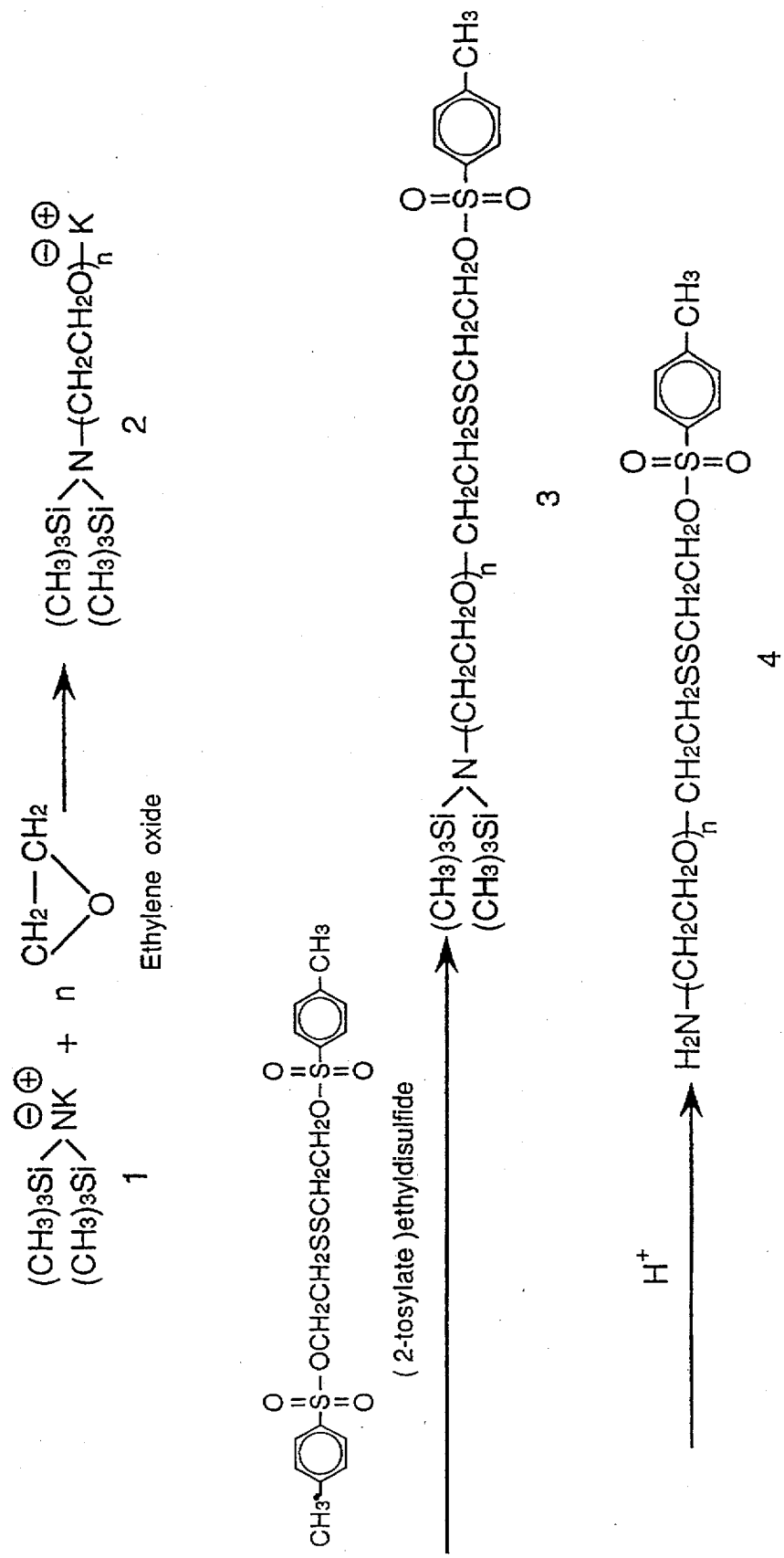
FIG. 3 is a drawing showing a pathway for the synthesis of a polyethylene oxide having a primary amino group at one end and a disulfide group at another end.

According to the same procedure as in Example 1, 6.03 g (0.137 mol) ethylene oxide was polymerized over 3 days in 20 ml tetrahydrofuran in the presence of 2.74×10$^{-3}$ mol potassium bis(trimethylsilyl)amide. 10 ml of the reaction solution was allowed to react over 3 hours at room temperature with 0.791 g (2-tosylate) ethyldisulfide having been dissolved in 10 ml tetrahydrofuran. Subsequently, the solution was added dropwise to 200 ml diethyl ether, to give precipitates which in turn were dried under vacuum. (See FIG. 3.) The yield was 1.98 g. Analysis of the product by the same gel filtration type high performance liquid chromatography as in Example 1 revealed that the average molecular weight was 4000, and the "weight-average molecular weight/number average molecular weight" was 1.1. The absorption at 264 nm was measured, and the rate of reaction of the alkoxide end (—O$^-$K$^+$) with (2-tosylate)ethyldisulfide was 72% calculated assuming that the molar absorption coefficient of the tosyl group introduced is the same as that of the tosyl group of (2-tosylate) ethyldisulfide. As shown in FIG. 3, a polyethylene oxide with a primary amino group at one end and a disulfide group at another end could be obtained by treatment with diluted hydrochloric acid. The polymerization degree (n) of the polymer obtained in this example is 90.

Example 4

According to the same procedure as in Example 1, 6.05 g (0.104 mol) propylene oxide (racemate) was polymerized over 21 hours in 15 ml tetrahydrofuran in the presence of 1.49×10$^{-3}$ mol potassium bis(trimethylsilyl)amide. The product was dried under vacuum and then analyzed by the same gel filtration type high-performance liquid chromatography as in Example 1. As a result, it was found that the average molecular weight was 1200, and the "weight-average molecular weight/number-average molecular weight" was 1.3.

The polymer obtained in this example is represented by the following formula (VI):

 (VI)

and this product is a polyether with a polymerization degree (n) of 20 with a primary amino group at one end and a hydroxyl group at another end.

Example 5

According to the same procedure as in Example 1, 1.76 g (0.04 mol) ethylene oxide was polymerized over 3 days in 20 ml tetrahydrofuran in the presence of 1 mmol potassium bis(trimethylsilyl)amide. The reaction mixture was added a DMSO solution containing 1 mmol tert-butyl bromoacetate, and the mixture was allowed to react over 24 hours at room temperature. The reaction mixture was then added dropwise to 500 ml diethyl ether, thereby forming precipitates which in turn were dried under vacuum. Analysis of the product by the same gel filtration type high-performance liquid chromatography as in Example 1 revealed that the average molecular weight was 1800, and the weight-average molecular weight/number-average molecular weight was 1.1.

$^{13}$C-NMR(CDCl$_3$): 27.9, 54.5, 61.8, 70.3

This compound was treated with potassium tert-butoxide in DMSO, whereby a polyethylene oxide having a primary amino group at one end and a carboxyl group at another end could be obtained.

Example 6

According to the same procedure as in Example 1, 3.52 g (0.08 mol) ethylene oxide was polymerized over 3 days in 20 ml tetrahydrofuran in the presence of 1 mmol potassium bis(trimethylsilyl)amide. The reaction mixture was added a tetrahydrofuran solution containing 1 mmol ethylene sulfide. Then, the mixture was allowed to react over 24 hours at room temperature, and the reaction was stopped by adding a small amount of acetic acid. Subsequently, the reaction mixture was added dropwise to 500 ml diethyl ether, thereby forming precipitates which in turn were dried under vacuum. Analysis of the product by the same gel filtration type high-performance liquid chromatography as in Example 1 revealed that the average molecular weight was 3800, and the weight-average molecular weight/number-average molecular weight was 1.1.

$^{13}$C-NMR(CDCl$_3$): 23.8, 54.4, 70.4

This compound was obtained as a polyethylene oxide having a primary amino group at one end and a mercapto group at another end.

What is claimed is:

1. A composition for forming a polyether having an amino group at one of its ends, comprising:

(a) an epoxy compound of formula (IV):

(IV)

wherein $R_1$ is selected from the group consisting of a hydrogen atom, an alkyl group, an aryl group and an aralkyl group; and (b) an anion polymerization initiator selected from the group consisting of a bis(trialkylsilyl)amide alkali metal salt and a phthalimide alkali metal salt, said epoxy compound and said anion polymerization initiator being present in an amount sufficient to initiate the polymerization of the epoxy compound so as to form said polyether.

2. The composition of claim 1, wherein the bis (trialkylsilyl)amide alkali metal salt is potassium bis (trimethylsilyl)amide.

* * * * *